United States Patent [19]

Hagimori

[11] Patent Number: 5,644,781
[45] Date of Patent: Jul. 1, 1997

[54] MICROCOMPUTER HAVING A SECURITY FUNCTION FOR STORED DATA

[75] Inventor: Haruo Hagimori, Kyoto, Japan

[73] Assignee: Rohm Co., Ltd., Kyoto, Japan

[21] Appl. No.: 4,295

[22] Filed: Jan. 14, 1993

[30] Foreign Application Priority Data

Jan. 14, 1992 [JP] Japan ................................. 4-024613

[51] Int. Cl.$^6$ ........................ G06F 9/26; G06F 12/14; G06F 15/04
[52] U.S. Cl. ................... 395/800; 395/430; 395/490; 235/380; 235/382
[58] Field of Search .................................. 235/380–382, 235/487; 380/3, 23, 24; 395/425, 800, 800.36, 800.37, 430, 490; 365/228

[56] References Cited

U.S. PATENT DOCUMENTS

| | | | |
|---|---|---|---|
| 4,211,919 | 7/1980 | Ugon | 235/487 |
| 4,698,750 | 10/1987 | Wilkie et al. | 395/425 |
| 4,816,656 | 3/1989 | Nakano et al. | 235/380 |
| 5,006,698 | 4/1991 | Barakat | 235/382 |
| 5,062,075 | 10/1991 | Yoshida et al. | 395/425 |
| 5,173,876 | 12/1992 | Kanashima et al. | 365/189.07 |
| 5,206,938 | 4/1993 | Fujioka | 395/400 |

FOREIGN PATENT DOCUMENTS 0268142  5/1988  European Pat. Off. .
2227107  7/1990  United Kingdom .

OTHER PUBLICATIONS

Greenfield, Joseph, "Practical Digital Design Using ICs", 1983, pp. 158–187.

Mano, Morris, "Computer System Architecture", 1982 pp. 21–35, 69–71.

Greenfield, Joseph, "Practical Digital Design Using IC's", 1983, pp. 158–187.

Mano, Morris, "Computer System Architecture", 1982, pp. 21–35, 69–71, 188.

Primary Examiner—Alyssa H. Bowler
Assistant Examiner—Robert E. Stachler, II
Attorney, Agent, or Firm—Fay, Sharpe, Beall, Fagan, Minnich & McKee

[57] ABSTRACT

A microcomputer includes a ROM storing various instruction codes including an invalidation instruction code for invalidating a content of an instruction decoder. The invalidation instruction code is read from the ROM and decoded in order to produce an invalidation control signal when a predetermined security execution condition is established. Thus, the security of data contained in the instruction decoder is improved by the ability to physically invalidate an operation of the instruction decoder by writing a predetermined value into the instruction decoder or by erasing its content.

3 Claims, 1 Drawing Sheet

MICROCOMPUTER HAVING A SECURITY FUNCTION FOR STORED DATA

TECHNICAL FIELD

The present invention relates to a microcomputer and an IC card having the same and, particularly, to a single chip microcomputer having an improved security function for data stored therein.

BACKGROUND OF THE INVENTION

An individual identification (IC) card is usually equipped with a single chip microcomputer and featured with multiple functions. Recently, the application field of IC cards is being expanded to the individual employees of a company. In such case, the use of IC cards is limited to time-cards as well as cards for settling food costs in an employee's restaurant in which management of things such as security, etc., is very easy and in which the features of the IC card are not used efficiently.

FIG. 2 shows a general construction of a conventional single chip microcomputer used in such IC card or other control devices.

In FIG. 2, the microcomputer is shown with an instruction decoder (ID-ROM) 1, a ROM 2 for storing instruction codes (PROG-ROM), a program counter 3 and an operation circuit (ALU) 4.

The PROG-ROM 2 stores an application program 2a represented as a collection of instruction codes.

Although it further includes registers and a RAM etc., details thereof are omitted here for simplicity of description.

With such construction, the application program 2a is executed according to the following procedure.

First, an instruction code B at an address A of the PROG-ROM 2 indicated by the program counter 3 is written to instruction decoder 1.

Then, in response to the instruction code B, the instruction decoder 1 decodes a memory content thereat and produces a control signal C for the program counter 3 and a control D for the operation circuit 4, etc.

The operation circuit 4 responds to the control signal D by performing an arithmetic operation such as addition or shifting, a resultant of which being stored in a register (not shown), etc.

The program counter 3 responds to the control signal C to increment the value of address A, i.e., jump to the next address.

By successively processing a series of instruction codes of the application program 2a in this manner, the program is executed.

Thus, various functions of the single chip microcomputer used as an IC card are realized.

Such an IC card is equipped with a single chip microcomputer by which various functions are realized according to the application program.

Up to now, such an IC card has not become as popular as expected in view of its cost as well as security problems.

Among others, the cost problem may be quickly overcome by the economical effect of mass production, if it becomes as popular as other IC cards.

However, with respect to the security problem, such a quick resolution cannot be expected. Therefore, this problem must be solved on a purely technically basis. Particularly, a bank IC card which is expected to be a key for the popularization of IC cards requires a high level of security.

For example, the security level required by such a bank IC card is much higher than that used in the conventional employee's IC card in which coding of communication data and ID checking are both performed by software. This is because of the possibility that a set of instructions contained in a microcomputer according to its architecture, i.e. an instruction set, is understood from a construction of an instruction decoder and memory content thereof add the content of program is understood by reading codes of the application program 2a.

In order to reduce cost of a single chip microcomputer and hence popularize IC cards, some hardware means for realizing high level security has been needed.

SUMMARY OF THE INVENTION

An object of the present invention is to provide a single chip microcomputer having a high level security function with the addition of minimum circuitry.

Another object of the present invention is to provide a card having a microcomputer and requiring an improved high level security function.

In order to achieve the above objects, according to the present invention, a single chip microcomputer is provided having:

a ROM for storing various instruction codes including an invalidation instruction code for invalidating a content of an instruction decoder.

The instruction decoder is in the form of a PROM for decoding instruction codes written from the ROM to produce a plurality of control signals, and having an invalidation control signal as one of the control signals.

Finally, a write control circuit is provided and is responsive to the invalidation control signal to write a predetermined value in the instruction decoder or erase its content The invalidation instruction code in the ROM is accessed and sent out when a predetermined security execution condition is established at or during the operating time of the microcomputer.

In the microcomputer having the above mentioned construction according to the present invention, the security execution condition is established when a control signal which is abnormal in software as well as in hardware is received, at which time, for example, an invalidation start signal can be produced as the invalidation control signal. For example, when the microcomputer detects an abnormality by a plurality of input errors of ID number or by checking means such as by a test program, it implements an instruction for producing the invalidation start signal. The write control circuit responds to the invalidation start signal from the instruction decoder and either writes predetermined information in the instruction decoder or erases its content.

The content of the instruction decoder which is in the form of a PROM can be erased by overwriting or erasing its memory content.

When the content of the instruction decoder is lost in this manner, the instruction set, that is, an architecture of the microcomputer in a limited sense, cannot be understood. Therefore, even if codes of the application program are read out, decoding of the content, meaning, structure and function, etc., of the application program is impossible.

Further, since the instruction decoder is the PROM for which writing can be done after completion of the IC card, its decoding is impossible by even manufacture of the IC card.

Therefore, with the single chip microcomputer according to the present invention, it is possible to realize a high level of hardware security means.

As to circuit size, the ROM which stores the application program and implements various functions occupies a considerable area of the chip. On the other hand, the instruction decoder is usually enough to decode a portion of several hundred bits of the instruction code except an address portion thereof. Therefore, the area of the chip to be occupied by the instruction decoder is relatively small. Therefore, an increase in the area of the whole chip due to the substitution of a PROM for the ROM, as the instruction decoder, is kept to a minimum.

Furthermore, the write control circuit having the function of invalidating the content of the instruction decoder may be a write control circuit used for writing data in the instruction decoder of a completed IC card or may be a simple erasing circuit when a flash memory is used as the PROM.

Therefore, an increase of the whole circuit size is not so large as to sacrifice other functions.

DESCRIPTION OF THE PREFERRED EMBODIMENT

Figure 1:
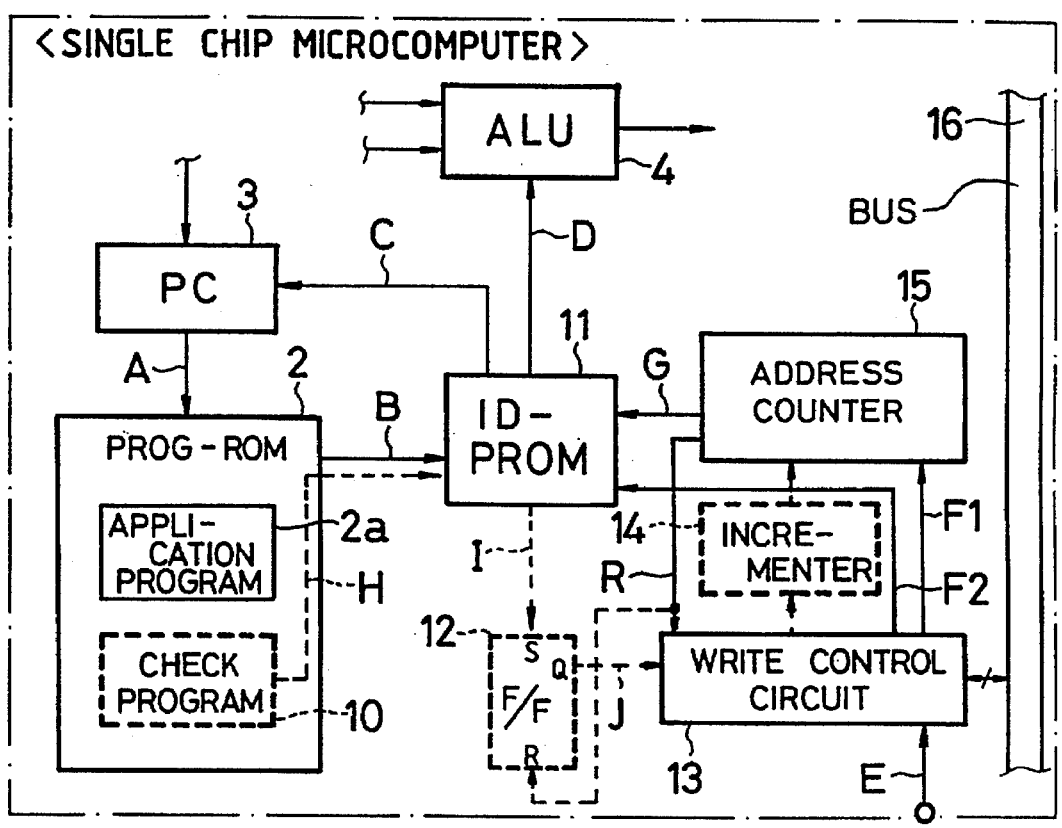
FIG. 1 is a block circuit diagram of an embodiment of a single chip microcomputer according to the present invention.
Figure 2:
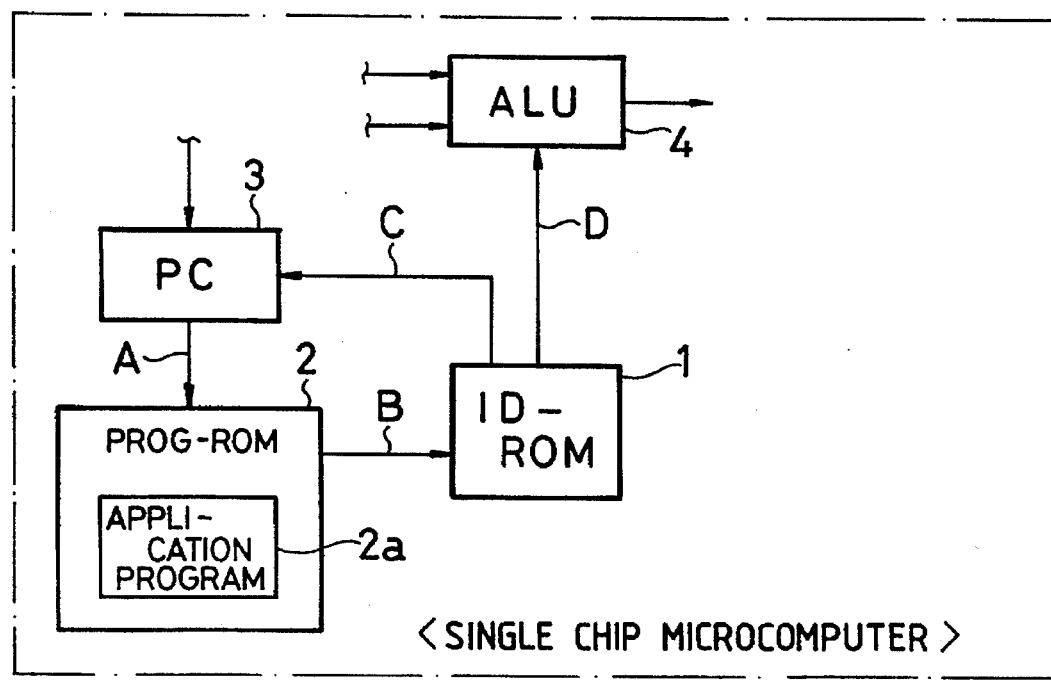
FIG. 2 is a block circuit diagram of a conventional single chip microcomputer.

An embodiment of the present invention will be described with reference to FIG. 1. In FIG. 1, a single chip microcomputer is shown having a ROM (PROG-ROM) 2 for storing instruction codes, a program counter (PC) 3 and an operation circuit (ALU) 4.

The microcomputer also is provided with an instruction decoder (ID-PROM) 11, a flip-flop 12, a write control circuit 13, an incrementer circuit 14 and an address counter 15.

The PROG-ROM 2 is constituted with an EEPROM or EPROM and stores an application program 2a represented by a collection of instruction codes and a check (test) program 10 for detecting an abnormal state.

Although PROG-ROM 2 usually includes other components such as registers, RAM, bus lines an interfaces, etc., such details are omitted since they have no direct relation to the present invention.

The check program 10 includes, as a major portion thereof, a conventional check program in which check is performed by reference, including scrambled reference, of, for example, an ID number to a secret registration number. A software abnormality check is performed, and when there is no abnormality, the application program 2a is executed. On the other hand, when an abnormality is detected, an instruction for producing the invalidation start signal, i.e., "1", is executed. When an abnormal signal, etc., is applied to a hardware through an external terminal of the IC card, it is detected by an abnormality detection circuit using such as a voltage detection circuit to execute the instruction for producing the invalidation start signal since there may be a case where the program and/or circuit construction are being deciphered. That is, the check program 10 is a practical example of a decision program for deciding whether or not a security execution condition is established. The execution of this instruction is preferably performed after a plurality of abnormality detections are counted.

As will be clear, since the check program 10 is basically prepared by adding a specific instruction execution function to the conventional program, it does not affect the size of the PROG-ROM 2 substantially.

The write control circuit 13 has a register therein which is responsive to an external write control signal E to set a write address data and a write data from an external terminal of the IC card through a bus 16. These data are sent from the write control circuit 13 to the address counter 15 and the instruction decoder 11 as signals F1 and F2, respectively. As a result, the address counter 15 produces an address signal G and a memory content corresponding to the instruction set is written in an address of the PROM of the instruction decoder 11 corresponding to the address signal G. The write control circuit 13 is responsive to a Q output of the flip-flop 12 to control the incrementer 14 to write "1" or "0" in respective addresses of the instruction decoder 11 sequentially while updating the address counter 15.

The flip-flop 12 is set upon the invalidation start signal from the instruction decoder 11. The write control circuit 13 may have a step-up circuit for writing data in the EEPROM.

Since the memory content of the instruction decoder can be written in the completed IC card unlike in the conventional ROM, even the manufacturer of the IC card can not decipher the content of the application program 2a unless he has a correspondence table between the content of ID-ROM and the instruction set.

The execution of the application program 2a and the check program 10 are usually performed by the following procedure:

First, a certain address A is set in the program counter 3 and an instruction code B at the address A in the PROG-ROM 2 indicated by the program counter 3 is read out.

Then, in response to the instruction code B, the instruction decoder 11 decodes the memory content to produce, for example, a control signal C for the program counter 3 and a control signal D for the operation circuit 4.

The operation circuit 4 responds to the control signal D to perform an arithmetic operation such as addition or shifting, with a resultant being stored in a register (not shown), etc.

The program counter 3 responds to the control signal C to increment the value of address A, i.e. jump to a next address.

Thus, a series of instruction codes of the application program 2a and the check program 10 are processed successively through the instruction decoder 11.

By the sequential execution of the application program 2a and the check program 10, various functions of an IC card or a controller are achieved. When the check program 10 is an execution condition of the application program, the check program 10 is executed first, as mentioned previously.

The above description is for a normal state operation. On the other hand, when some abnormality is detected by the check program 10 three times, for example, the check program 10 produces an instruction code H, which causes the invalidation start signal I to be produced. The number of abnormalities detected is counted by a soft-counter provided in a memory (not shown).

The instruction code H is decoded by the instruction decoder 11 as one of the instruction codes B. As a result of this decoding, the invalidation start signal I is produced.

The production of the invalidation start signal I is held in the flip-flop 12 and sent to the write control circuit 13.

The write control circuit 13 writes "1" or "0" in the PROM of the instruction decoder 11 while updating the address G from the address counter 15 through the incrementer circuit 14.

In this overwriting process, since a portion of memory content of the instruction decoder 11 is lost, the programs 2a and 10 are no longer executed normally. However, since the overwriting control signal J is continuously sent from the flip-flop 12 to the write control circuit 13, the write control circuit 13 operates independently to write to the instruction decoder 11 up to the last address thereof, until the content of the instruction decoder 11 is lost completely. When the address of the address counter 15 exceeds the last address of the instruction decoder 11, the flip-flop 12 is reset by a signal R from the address counter 15 and the write control circuit 13 stops its operation.

Therefore, it becomes in a state in which it is impossible to obtain the instruction set even by any hardware means.

Thus, it is impossible to decipher the content, meaning, structure and function, etc., of the application program even if the codes of the application program are read out.

The content of the instruction decoder 11 whose memory content is lost can be easily restored, by an authorized personnel, by externally adding the write control signal E to a predetermined terminal of the write control circuit 13 and inputting the write data and the write address to a predetermined I/O terminal of the microcomputer.

In FIG. 1, components added for additional security functions are shown by dotted lines. For the check program 10, the increase is very small and the flip-flop 12 and the incrementer circuit 14 are also small in view of integration density of current IC cards. Further, as mentioned previously, the write control circuit 13 and the address counter 15 for invalidating the content of the instruction decoder are those used in the write control circuit, etc., of the conventional instruction decoder. The size of the instruction decoder 11 is substantially smaller than that of the PROG-ROM 2. Therefore, the increases of circuit size due to the use of PROM instead of ROM as the instruction decoder 11 is slight.

Therefore, the increase of the circuit size as the whole chip can be kept to a minimum.

When, for example, a flash memory which is erasable by one operation is used as the PROM for the instruction decoder 11, the flip-flop 12 and the incrementer circuit 14 can be removed and, further, the address counter 15 may be removed according to a construction of the write control circuit 13.

Although the instruction decoder has been described as EEPROM or EPROM, it is not limited thereto. Any PROM can be used as the instruction decoder so long as it is a ROM in which the writing of "0" or "1" can be done by one operation since the content can be destroyed by the writing of "0" or "1" by the write control circuit.

What is claimed is:

1. A single chip microcomputer, comprising:

a ROM for storing various instruction codes and program data including an invalidation instruction code for invalidating a content of an instruction decoder;

said instruction decoder being in the form of a read-only memory, in which writing of binary digits is performed by one operation, for decoding instruction codes written out from said ROM to produce a plurality of control signals, wherein an invalidation control signal is one of said control signals when said invalidation instruction code is written out;

an address counter for assigning an address of said instruction decoder; and a write control circuit responsive to said invalidation control signal for overwriting a predetermined value in the assigned address of said instruction decoder;

wherein said invalidation instruction code in said ROM is accessed and sent out to the instruction decoder when the microcomputer detects one of an abnormality by a plurality of input errors and an abnormality by a checking means;

wherein said ROM contains a decision program for deciding whether said security execution condition is established, and wherein, when said security execution condition is established, said invalidation instruction code is written out;

wherein said ROM further contains an application program, and wherein said decision program is executed prior to execution of said application program;

wherein said instruction decoder comprises an EEPROM, and, when said invalidation instruction code is decoded by said instruction decoder, said write control circuit is activated to sequentially write specific data in said EEPROM; and further comprising a flip-flop and an incrementer circuit for incrementing said address counter;

wherein said flip-flop is set when said invalidation instruction code is decoded by said instruction decoder, said write control circuit being responsive to an output of said flip-flop when set to write said data in an address of said instruction decoder, and wherein said write control circuit writes said data while incrementing said address counter by said incrementer circuit.

2. The microcomputer according to claim 1, wherein said specific data is one of "0" and "1".

3. The microcomputer according to claim 1, wherein said decision of the establishment of said security execution condition is performed by referencing an externally input code to a secret code; wherein said write control circuit has a terminal for receiving an external write control signal; and wherein, when said external write control signal is received at said terminal, said write control circuit writes said write data in an address indicated by said address data of said instruction decoder on the basis of said input address data and said write data.

* * * * *